(12) United States Patent
Schaider et al.

(10) Patent No.: US 10,368,493 B2
(45) Date of Patent: Aug. 6, 2019

(54) PELLETING DEVICE

(71) Applicant: JOSEF SCHAIDER PRIVATSTIFTUNG, Staasdorf (AT)

(72) Inventors: Ludwig Schaider, Staasdorf (AT); Josef Schaider, Staasdorf (AT)

(73) Assignee: JOSEF SCHAIDER PRIVATSTIFTUNG, Staasdorf (AT)

( * ) Notice: Subject to any disclaimer, the term of this patent is extended or adjusted under 35 U.S.C. 154(b) by 54 days.

(21) Appl. No.: 15/550,505

(22) PCT Filed: Feb. 11, 2016

(86) PCT No.: PCT/AT2016/050027
§ 371 (c)(1),
(2) Date: Aug. 11, 2017

(87) PCT Pub. No.: WO2016/127196
PCT Pub. Date: Aug. 18, 2016

(65) Prior Publication Data
US 2018/0027740 A1    Feb. 1, 2018

(30) Foreign Application Priority Data
Feb. 11, 2015 (AT) .............................. A 50099/2015

(51) Int. Cl.
*B30B 11/22* (2006.01)
*B30B 11/28* (2006.01)
(Continued)

(52) U.S. Cl.
CPC .............. *A01F 15/07* (2013.01); *A01D 41/12* (2013.01); *A01D 45/00* (2013.01); *A01D 61/008* (2013.01);
(Continued)

(58) Field of Classification Search
CPC ...... A01D 41/133; A01D 41/12; A01D 45/00; A01D 61/008; A01D 69/00; A01D 82/02;
(Continued)

(56) References Cited

U.S. PATENT DOCUMENTS 2,848,738 A    8/1958 Bonnafoux
3,045,280 A    7/1962 Bonnafoux
(Continued)

FOREIGN PATENT DOCUMENTS

BE    672 992 A    5/1966
DE    1 211 841 B    3/1966
(Continued)

OTHER PUBLICATIONS

International Search Report, dated Aug. 30, 2016, from corresponding PCT application No. PCT/AT2016/050027.
(Continued)

*Primary Examiner* — Robert E Pezzuto
(74) *Attorney, Agent, or Firm* — Young & Thompson

(57) ABSTRACT

A pelleting device, designed as a field-guided stalk-crop harvesting machine for connection to a tractor and a chopper, wherein a diesel engine drives a current generator and an annular die press, configured such that chopped stalk material passes into a drying chamber and is propelled via a screw conveyor into the die press, wherein the annular die of the die press is mounted in ring bearings on a base, on which a pair of pivot levers for a pan grinder roller is also hinged.

20 Claims, 1 Drawing Sheet

(51) Int. Cl.
*A01F 15/00* (2006.01)
*A01F 15/07* (2006.01)
*B30B 11/00* (2006.01)
*B30B 11/20* (2006.01)
*C10L 5/36* (2006.01)
*C10L 5/44* (2006.01)
*A01D 41/12* (2006.01)
*A01D 45/00* (2018.01)
*A01D 61/00* (2006.01)
*A01D 69/00* (2006.01)
*A01D 82/02* (2006.01)

(52) U.S. Cl.
CPC ............. *A01D 69/00* (2013.01); *A01D 82/02* (2013.01); *B30B 11/006* (2013.01); *B30B 11/207* (2013.01); *C10L 5/363* (2013.01); *C10L 5/445* (2013.01); *C10L 2290/06* (2013.01); *C10L 2290/30* (2013.01); *C10L 2290/50* (2013.01); *C10L 2290/567* (2013.01); *Y02E 50/10* (2013.01); *Y02E 50/30* (2013.01)

(58) Field of Classification Search
CPC ......... A01D 82/00; A01F 15/07; A01F 15/04; A23N 17/005; B01J 2/22; B27N 1/00; B27N 3/04; B29B 9/14; B30B 11/28; B30B 11/006; B30B 11/201; B30B 11/202; B30B 11/208; B30B 11/005; B30B 11/207; C08J 5/046; C08L 23/02; C08L 23/10; C08L 23/20; C10L 5/363; C10L 5/445

USPC .... 56/1, 10.2 R, 16.4 D, 12.2; 425/317, 331, 425/365; 460/118
See application file for complete search history.

(56) References Cited

U.S. PATENT DOCUMENTS

| | | | |
|---|---|---|---|
| 3,202,113 A | 8/1965 | Love | |
| 3,332,111 A | 7/1967 | Hafliger | |
| 3,664,097 A | 5/1972 | Pedigo | |
| 4,355,573 A | 10/1982 | Berry | |
| 5,156,570 A * | 10/1992 | Justice, III | A01D 41/133 34/180 |
| 5,622,037 A | 4/1997 | Haimer | |
| 7,241,127 B2 * | 7/2007 | Hanimann | B30B 11/201 425/331 |
| 8,211,341 B2 * | 7/2012 | Lustiger | B29B 9/14 264/118 |

FOREIGN PATENT DOCUMENTS

| | | |
|---|---|---|
| DE | 27 01 426 A1 | 7/1977 |
| EP | 0 040 406 A1 | 11/1981 |
| EP | 2 289 682 A1 | 3/2011 |
| SU | 683684 A1 | 9/1979 |
| SU | 825337 A1 | 4/1981 |
| WO | 81/02238 A1 | 8/1981 |

OTHER PUBLICATIONS

AT Office Action, dated Aug. 7, 2015, from corresponding AT application No. A 50099/2015.

* cited by examiner

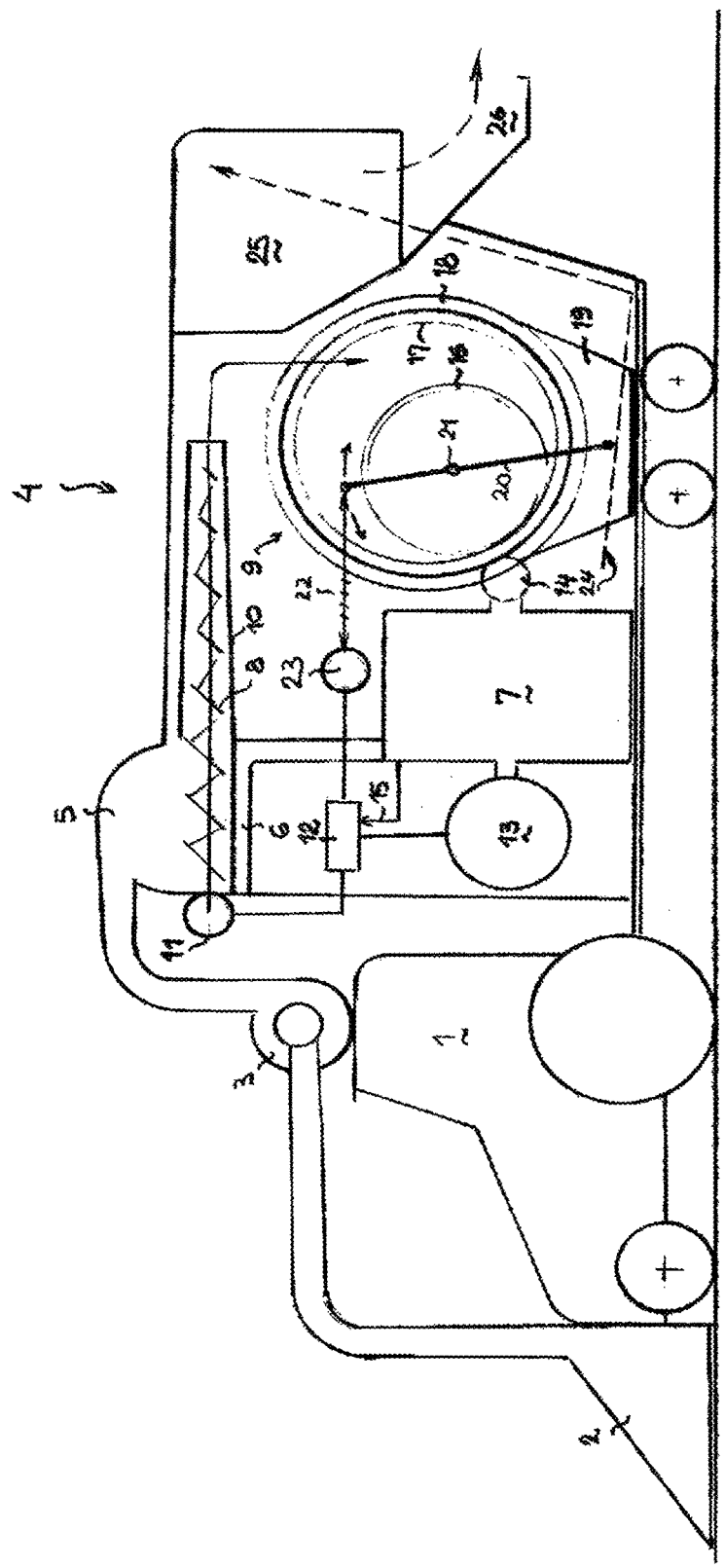

PELLETING DEVICE

TECHNICAL FIELD

The invention relates to a pelleting device, in particular for a field-guided mobile stalk-crop harvesting machine with a built-in internal combustion engine, e.g., with a diesel engine, a unit for preheating the stalk material fed from a chopper with the waste heat of the internal combustion engine, a screw conveyor for the stalk material and with a pelleting press, whereby the internal combustion engine drives a current generator, which feeds drive motors and servomotors via switch components.

STATE OF THE ART

Such a device is known from
patcit0001: EP 2289682 A—.

Biomass is a renewable raw material and important as an energy source. However, for stalk material-like biomass, i.e., for example, harvest residue such as straw, and for energy crops such as *miscanthus, rumex, sida* or giant knotweed, economic problems arise. Because of the low bulk density (maximum bale of straw 130 kg/m$^3$), the logistical, handling and production costs of applicable pressed items exceed economical uses, so that a shift is made to conventional energy sources. This is unfortunate since most energy crops grow in soils that are not qualitatively suitable for growing food crops. The energy crops are in most cases perennials and deep-rooting, so that the seed costs, e.g., within 15 years, are only incurred once. Also, these plants are extremely robust and rarely require fertilization or the use of pesticides. They store $CO_2$ in the soil; the roots in particular reach depths of up to 4 m and thus help to enrich the soil. It is therefore a goal, in terms of a permanent energy policy, to find a technical option that allows economical use for energy conversion.

It has been found, according to
patcit0002: U.S. Pat. No. 5,622,037—
that logistical savings can be achieved in that the processing to form pressed items, i.e., for example, for pellets as energy sources, be carried out directly on site right in the field in one operation. A crop-harvesting machine of the type disclosed in the US publication has, however, generated purchase and operating costs that are not compatible with the yield from the press used there and the drives.

PRESENTATION OF THE INVENTION

The object of the invention is therefore to improve a pelleting device of the above-described type with respect to the energy balance. This is achieved in that the internal combustion engine also drives a ring die of a ring die press with at least one pan grinder roller. A ring die press with a pan grinder roller that is used is thus driven directly by a diesel engine, while other components of the mobile crop-harvesting machine comprise adjustable electric drive motors, whose current is delivered via the diesel-electric supply unit. The current generator must therefore not be as powerful as according to the above-mentioned
patcit0003: EP 2289682 A—.

In the case of a concrete embodiment, the diesel engine is provided only for the processing of biomass. It operates at constant speed because of the current generator to be driven. In order to compensate for power fluctuations, the amount of injection varies. According to one configuration of the invention, a controller for the speed of the screw conveyor is one of the switch components. As an alternative to the adjustment based on the reaction forces in the press, it is expedient for the controller to be governed by the load-dependent and variably-injected amount of fuel of the diesel engine that operates at constant speed and for the drive motor of the screw conveyor feeding the ring die press to be regulated inversely proportionally to the injection amount. An increase in the injection amount brings about the reduction in speed of the screw conveyor. If less biomass is fed to the ring die press, then the ring die press is relieved, and the diesel drive can again operate with a reduced injection amount.

Preferably, the pan grinder roller is designed as a circular-cylindrical hollow sieve roller. As a result, the ring die press is doubly effective, since both the ring die and the pan grinder roller have perforations, and the pressed items accumulate both outside on the lateral surface of the ring die and inside on the cylindrical surface of the pan grinder roller.

In a suitable way, the assembly is pulled by a tractor, which has a chopper on its front end. From the latter, the crushed biomass is fed over the tractor to the pelleting device by means of a blower. The ring die press has servomotors, which engage via self-locking gears on parallel pivot levers, which laterally encompass and hold the pan grinder rollers and which can be adjusted in inclination to determine the roller gap relative to the inner lateral surface of the ring die. The design makes possible a flat feeding angle in the press area. This is advantageous for biomass because of the low bulk density. The setting of the roller gap is carried out via a controller based on the pressure applied by the press, which is picked up by sensors (piezoelectric elements) on the pivot levers, for example on the bearings. It is also expedient for the pivot levers to be mounted on a base and for the latter also to carry the annular bearing of the ring die of the ring die press and to receive its reaction forces. As a result, the design complexity is reduced to a few components. The reaction forces can be measured and used as reference variables for the regulation of the roller gap and the amount of fed biomass.

An essential improvement of the overall efficiency is produced when the biomass already comes precompressed to the pelleting press. It is therefore suitable when the screw conveyor has funnel-shaped housing elements for precompressing the biomass, in particular rods welded-in into the interior of the housing and distributed on the periphery, which rods form the generatrix of a cone envelope. A screw in a conically-narrowing housing per se is known in the art from
patcit0004: U.S. Pat. No. 3,664,097—.

It is intended for mounting on a mowing machine and is to compress the cut grass into pellets.

Depending on the type of biomass and the chopper that is used on the front end on the tractor, a fine chopper can also be placed upstream from a preheating unit in front of the feed to the pelleting press.

In a simple commercially-available screw conveyor with a screw surface within a circular-cylindrical lateral surface, the volume of the intermediate space can be reduced to the housing of the screw toward the output, by having the rods converge on the periphery at the output. As a result, a gradual reduction in the volume of biomass picked up in the peripheral gap is achieved in the conveying direction, and an increase in the material density is produced at the input of the pelleting press.

The pelleting device according to the invention can be used directly in the fields as a crop-harvesting machine or else can operate, e.g., during non-crop-harvesting times, without a tractor completely independently in a stationary operation (stand-alone).

SHORT DESCRIPTION OF THE DRAWING

An embodiment is depicted in the drawing. It diagrammatically shows the design of a pelleting device as a stalk-crop harvesting machine for use right in the field.

BEST WAY TO EXECUTE THE INVENTION

A towing machine, here a tractor 1, is equipped on the front end with a chopper 2. The latter cuts and crushes, for example, crop straw, sunflower straw, corn crops, or corn straw or bioproducts ("energy crops") grown only for the purpose of the production of biomass, such as giant knotweed or *miscanthus*. The crushed biomass passes over a blower 3 into a harvesting machine 4 pulled by the tractor 1. This has—if need be connected to a fine chopper—an input area as a dry chamber 5, which has a heat exchanger 6, for example in the form of an at least partial sheathing of the dry chamber 5. The heat exchanger 6 is connected to a diesel engine 7, whose waste heat is fed to the heat exchanger 6. The chopped biomass that is stored intermediately in the dry chamber 5 is removed by a screw conveyor 8 and compressed en route to a ring die press 9. To this end, either the housing 10 and/or the screw itself is designed with a taper. Rods can also be provided in the housing 10 with a circular-cylindrical design thereof in the interior, which form the generatrix of a cone envelope and converge toward the output of the screw conveyor 8. The latter has an electric drive motor 11, which is fed via a controller 12 by a current generator 13. The drive of the current generator 13 is done at constant speed via the diesel engine 7, which drives the ring die press 9 via a transmission 14. If the load of the diesel engine 7 increases because of an increased power demand of the ring die press 9, then more fuel is injected to maintain the constant speed of the diesel engine 7. This consumption forms the reference variable for the controller 12, as indicated by the arrow 15. With an increasing injection amount, the controller 12 reduces the speed of the screw conveyor 8, so that the ring die press 9 is loaded with less biomass and thus load is removed from it. The consumption of the diesel engine 7 decreases.

In the embodiment, the ring die press 9 operates with a pan grinder roller 16, which here also is designed as a circular-cylindrical hollow sieve roller.

The ring die 17 itself is mounted on the edge side in each case in a holding ring or ring bearing 18 in the form of a roller bearing, which is held by a base 19. This base 19 also accommodates the pivot bearing of a pair of pivot levers 20 that are arranged in parallel and that comprise the ring die 17 and the pan grinder roller 16 in a forklike configuration and hold the pan grinder roller 16 (bearing 21). With the free ends of the two pivot levers 20, in each case spindles 22 are connected to electrical servomotors 23, via which the roller gap between the pan grinder roller 16 and the ring die 17 can be adjusted. In the case of pressing force that is too high, the pivot lever 20 can be pivoted to the right via the controller 12 and the servomotors 23 in the embodiment, and the roller gap can be increased. Additional criteria for adjusting the roller gap are the specific conditions of the accumulating biomass (e.g., straw or shavings), its moisture, and the mechanical quality of the pellets.

The pellets that accumulate both from the interior of the pan grinder roller 16 and outside on the ring die 17 in the area of the roller gap are collected (cup 24) and conveyed by means of a blower or a conveyor belt into a silo 25 and pass on demand into an output 26. The advantage of this arrangement lies in the compact design of the ring die press 9 with the base 19 and the pivot levers 20 that are mounted on the latter for the pan grinder roller 16 as well as in the use of the diesel engine 7 as a pressing drive, but also as a generator drive for the adjustable drive motors and servomotors 11 and 23. When the harvesting machine 4 is not being used in the fields, it can then be stationary and can be operated independently of a tractor 1 and a chopper 2, for example with wood scraps from the forest or with other waste materials. This is of great importance during the time when no field crops are available for pellet production. Also, the harvesting machine 4 that is turned off is fully operational and can produce pellets from crushed wood or small shredded combustible waste products.

The invention claimed is:

1. A pelleting device for a field-guided mobile stalk-crop harvesting machine (4), comprising:
    a built-in internal combustion engine (7);
    a unit for preheating stalk material, fed from a chopper (2), with waste heat of the internal combustion engine (7);
    a screw conveyor (8) for the stalk material; and
    a ring die pelleting press (9) with at least one pan grinder roller (16),
    wherein the internal combustion engine (7) drives a current generator (13), which feeds servomotors and a drive motor of the screw conveyor via switch components, and
    wherein the internal combustion engine (7) also drives a ring die (17) of the ring die pelleting press (9).

2. The pelleting device according to claim 1, wherein one of the switch components is a controller (12) that controls a speed of the screw conveyor (8).

3. The pelleting device according to claim 2, wherein the controller (12) is governed by a load-dependent and variably-injected amount of fuel of the engine (7) that operates at constant speed, and the drive motor of the screw conveyor (8) feeding the ring die pelleting press (9) is regulated inversely proportionally to the injection amount.

4. The pelleting device according to claim 1, wherein the pan grinder roller (16) is designed as a circular-cylindrical hollow sieve roller.

5. The pelleting device according to claim 1, wherein the servomotors (23) engage via self-locking gears on parallel pivot levers (20), which laterally encompass and hold the pan grinder roller (16) and which are adjustable in inclination to determine a roller gap relative to an inner lateral surface of the ring die (17) of the ring die pelleting press (9).

6. The pelleting device according to claim 5, wherein the pivot levers (20) are mounted on a base (19), and the base also carries an annular bearing (18) of the ring die (17) of the ring die pelleting press (9).

7. The pelleting device according to claim 1, wherein the screw conveyor (8) includes funnel-shaped housing housing elements for precompressing the biomass, formed of rods welded into an interior of the housing (10) and distributed on a periphery of the interior so as to form a cone envelope.

8. The pelleting device according to claim 2, wherein the pan grinder roller (16) is designed as a circular-cylindrical hollow sieve roller.

9. The pelleting device according to claim 3, wherein the pan grinder roller (16) is designed as a circular-cylindrical hollow sieve roller.

10. The pelleting device according to claim 2, wherein the servomotors (23) engage via self-locking gears on parallel pivot levers (20), which laterally encompass and hold the pan grinder roller (16) and which are adjustable in inclination to determine a roller gap relative to an inner lateral surface of the ring die (17) of the ring die pelleting press (9).

11. The pelleting device according to claim 3, wherein the servomotors (23) engage via self-locking gears on parallel pivot levers (20), which laterally encompass and hold the pan grinder roller (16) and which are adjustable in inclination to determine a roller gap relative to an inner lateral surface of the ring die (17) of the ring die pelleting press (9).

12. The pelleting device according to claim 4, wherein the servomotors (23) engage via self-locking gears on parallel pivot levers (20), which laterally encompass and hold the pan grinder roller (16) and which are adjustable in inclination to determine a roller gap relative to an inner lateral surface of the ring die (17) of the ring die pelleting press (9).

13. The pelleting device according to claim 2, wherein the screw conveyor (8) includes funnel-shaped housing elements for precompressing the biomass, formed of rods welded into an interior of the housing (10) and distributed on a periphery of the interior so as to form a cone envelope.

14. The pelleting device according to claim 3, wherein the screw conveyor (8) includes funnel-shaped housing elements for precompressing the biomass, formed of rods welded into an interior of the housing (10) and distributed on a periphery of the interior so as to form a cone envelope.

15. The pelleting device according to claim 4, wherein the screw conveyor (8) includes funnel-shaped housing elements for precompressing the biomass, formed of rods welded into an interior of the housing (10) and distributed on a periphery of the interior so as to form a cone envelope.

16. The pelleting device according to claim 5, wherein the screw conveyor (8) includes funnel-shaped housing elements for precompressing the biomass, formed of rods welded into an interior of the housing (10) and distributed on a periphery of the interior so as to form a cone envelope.

17. The pelleting device according to claim 6, wherein the screw conveyor (8) includes funnel-shaped housing elements for precompressing the biomass, formed of rods welded into an interior of the housing (10) and distributed on a periphery of the interior so as to form a cone envelope.

18. The pelleting device according to claim 8, wherein the screw conveyor (8) includes funnel-shaped housing elements for precompressing the biomass, formed of rods welded into an interior of the housing (10) and distributed on a periphery of the interior so as to form a cone envelope.

19. The pelleting device according to claim 9, wherein the screw conveyor (8) includes funnel-shaped housing elements for precompressing the biomass, formed of rods welded into an interior of the housing (10) and distributed on a periphery of the interior so as to form a cone envelope.

20. The pelleting device according to claim 10, wherein the screw conveyor (8) includes funnel-shaped housing elements for precompressing the biomass, formed of rods welded into an interior of the housing (10) and distributed on a periphery of the interior so as to form a cone envelope.

\* \* \* \* \*